Patented June 25, 1946

2,402,673

UNITED STATES PATENT OFFICE 2,402,673

VACUUM DEHYDRATION OF PEAS

Robert M. Schaffner, Chicago, Ill., assignor to The Guardite Corporation, a corporation of Illinois No Drawing. Application May 31, 1944, Serial No. 538,200

2 Claims. (Cl. 99—204)

This invention relates to the vacuum dehydration of peas.

In the conventional drying of peas, the characteristic flavor and color of the fresh vegetable are partially or almost completely destroyed. The present process substantially eliminates deterioration in flavor or color so that after drying and dehydration, followed by cooking, the peas resemble freshly picked and cooked peas.

The peas are first blanched. If the dehydrating plant is more than an hour's distance from the field, it is desirable to blanch the peas in the field, chill them and then transport them for dehydration. In the field, the blanching may be accomplished by immersing freshly picked peas in hot water at temperatures below the boiling point for periods of from 2 to 10 minutes. A temperature range of 185° to 192° F. is found to be particularly satisfactory with blanching periods from 5 to 3 minutes. After blanching, the peas are cooled by immersion in cold water below 70° F. Water at 55° or 60° F. is particularly satisfactory since this reduces the peas below 70° in a reasonably short time. It is preferred to cool the peas below 60° F. for transportation. The peas may be frozen if equipment is available. It is preferred to carry out the blanching at the dehydration plant. There the peas are shelled, washed and vacuum blanched. In this process the shelled, washed peas are loaded on foraminous trays at loading densities of 0.8 to 1.5 lbs. per square foot. The higher ranges correspond to the larger size peas. The loaded trays are put into a vacuum blancher which is then evacuated to remove substantially all of the air. Steam is then admitted to the chamber to produce a temperature between 150° and 210° F. The time required varies with the temperature, but a satisfactory product can be obtained by blanching at 185° F. for five minutes. The peas are then cooled by evacuation, preferably to 60° F. or lower. A temperature of 59° F. can be produced by holding the final pressure at one-half inch of mercury.

The peas which have been blanched by either process are then transferred to the vacuum dryer. When vacuum blanching is employed, the peas are transferred to the dryer without subjection to the air. They are then dried in an atmosphere of superheated steam while exposed to radiant heat surfaces. A satisfactory product was obtained by exposing screen-bottomed trays of peas loaded at 1.0 lb. per square foot of density, in an atmosphere of superheated steam maintained at a pressure of 2¼ inches of mercury. Radiant heat was supplied for 45 minutes from a surface maintained at 324° F. and approximately 3 inches from the tray followed by similar treatment for 140 minutes in which the surface was maintained at 292° F. Initial temperatures as high as 338° F. and final temperatures as low as 228° F. have been satisfactorily employed.

In the specific example given the peas treated were jumbo peas from Lakemills, Wisconsin. They had been field blanched for six minutes at 192–200° F., refrigerated by freezing, and then thawed before drying. The final moisture content was 10% and the product had a reconstitution coefficient of 58.6. The color was excellent.

The distance figures for the heating coils are to the nearest point on 2½" outer diameter pipes ¼" apart.

The foregoing detailed description has been given for clearness of understanding only, and no unnecessary limitations should be understood therefrom.

What I claim as new, and desire to secure by Letters Patent, is:

1. The method of dehydrating fresh peas which comprises blanching the peas promptly after picking, at a temperature below the boiling point, cooling the peas and maintaining them at a temperature below 70° F., and then vacuum drying the peas at a pressure of approximately 2¼ inches of mercury in an atmosphere of superheated steam while exposed to a radiant heat atmosphere while distributed at a loading density of between 0.8 and 1.5 lbs. per square foot, and while subjected to a source of radiant heat maintained close to the product and at a temperature between approximately 228° F. and 338° F. and maintaining the product under reduced pressure in an atmosphere of superheated steam while subject to intense radiant energy until the moisture content thereof has been reduced substantially as low as 10%.

2. The method of treating peas which comprises removing the air from freshly picked peas and substituting an atmosphere of steam under reduced pressure, rapidly increasing the steam pressure and raising the temperature thereof to produce a blanching temperature of approximately 185° F., maintaining the temperature for a time of approximately five minutes to blanch the peas, rapidly reducing the temperature and pressure, transferring the peas to a vacuum dryer without contact with air and then drying the peas in an atmosphere of superheated steam at subatmospheric pressure and while subjected to intense radiant heat, said peas being maintained in the drying zone on screens loaded between 0.8 and 1.5 pounds per square foot of screen surface.

ROBERT M. SCHAFFNER.